United States Patent [19]

McNamara

[11] 4,446,447
[45] May 1, 1984

[54] CIRCUIT FOR CONVERTING PRESSURE VARIATION TO FREQUENCY VARIATION

[75] Inventor: David A. McNamara, Ypsilanti, Mich.

[73] Assignee: Ford Motor Company, Dearborn, Mich.

[21] Appl. No.: 469,666

[22] Filed: Feb. 25, 1983

Related U.S. Application Data

[63] Continuation of Ser. No. 219,083, Dec. 22, 1980, abandoned.

[51] Int. Cl.³ .................. G01L 9/12; H03B 21/01
[52] U.S. Cl. ........................... 331/42; 73/718; 73/724; 331/65; 331/108 D; 331/111; 340/658
[58] Field of Search ............ 331/65, 37, 42, 25, 331/111, 108 D; 324/79 R, 79 D; 73/1 B, 4 R, 708, 718, 719, 724, 725; 340/146.2, 658, 626

[56] References Cited

U.S. PATENT DOCUMENTS

| | | | |
|---|---|---|---|
| 3,354,398 | 11/1967 | Broadhead, Jr. | 328/133 |
| 3,514,705 | 5/1970 | Feigleson | 328/133 |
| 3,534,261 | 10/1970 | Haner et al. | 324/79 |
| 3,543,177 | 12/1970 | Chang | 331/25 |
| 3,576,532 | 4/1971 | Kaps | 340/146.2 |
| 3,585,508 | 6/1971 | Crowther | 328/134 |
| 3,611,160 | 10/1971 | Beauvisla | 328/133 |
| 3,614,651 | 10/1971 | Pasquier | 331/65 |
| 3,619,651 | 11/1971 | Aldrich | 307/233 |
| 3,644,721 | 2/1972 | Preiser | 235/150.3 |
| 3,656,063 | 4/1972 | Vollmer | 328/133 |
| 3,719,836 | 3/1973 | Possell | 307/308 |
| 3,735,324 | 5/1973 | Phillips | 328/133 |
| 3,745,473 | 7/1973 | Klein et al. | 328/133 |
| 3,821,659 | 6/1974 | Ludwig | 331/65 |
| 3,857,103 | 12/1974 | Grazia | 328/133 |
| 3,886,473 | 5/1975 | Heyck | 331/42 |
| 3,906,787 | 9/1975 | Wingbermuhle | 73/862.33 |
| 3,973,208 | 8/1976 | Diamond | 328/5 |
| 4,020,422 | 4/1977 | Underhill | 328/133 |
| 4,225,828 | 9/1980 | Watanabe et al. | 331/25 X |
| 4,316,158 | 2/1982 | Akita et al. | 331/DIG. 3 X |

Primary Examiner—Siegfried H. Grimm
Attorney, Agent, or Firm—Peter Abolins; Clifford L. Sadler

[57] ABSTRACT

A transducer for converting a pressure variation to a variation in the frequency of a periodic function includes a reference oscillator and a sensor oscillator coupled to a digital mixer. The reference oscillator includes a reference capacitor and reference resistor for providing a reference periodic electrical signal having a frequency which is a function of the reference timing capacitor and reference resistor. Similarly, the sensor oscillator has a variable sensor timing capacitor and a sensor resistor for providing a sensor periodic electrical signal having a frequency which is a function of the variable sensor timing capacitor and sensor resistor. The digital mixer generates a mixed periodic electrical signal having a frequency proportional to the difference between the reference and sensor electrical signals. The transfer function of the transducer relates pressure and frequency and is adjustable by adjustment of the magnitude of the reference and sensor resistors.

7 Claims, 5 Drawing Figures

CIRCUIT FOR CONVERTING PRESSURE VARIATION TO FREQUENCY VARIATION

This is a continuation application of Ser. No. 219,083 filed on Dec. 22, 1980 and now abandoned.

BACKGROUND

1. Field of the Invention

This invention relates to a circuit for converting pressure variation to a variation in the frequency of a periodic electrical output signal of the circuit.

2. Prior Art

Many capacitive transducers have been designed to provide a variation in electrical capacitance as a function of some other parameter. The other parameters may include pressure acting upon the "plates" of the capacitive transducer, the aligned areas of such plates, the positions of the plates as a function of mechanical movement, the type of dielectric material between the capacitive plates, and combinations of these. All of these capacitive transducers, however, have a common characteristic; they have a variation of an electrical capacitance that can be detected in a way that can provide a desired indication of the magnitude of the capacitance or its change and of the cause of such capacitance magnitude or change where the cause is the desired information.

Many prior art techniques are known for detecting capacitance variations. The electrical capacitance may be used, for example, to control an oscillator's frequency output and any capacitance variation can be made to cause a related variation in the output frequency. In U.S. Pat. No. 3,886,473 to Heyck, a capacitive transducer is described that converts a small displacement (such as could be caused by the effect of a pressure change on an aneroid) of a mechanical input member into a capacitance change. The Heyck system uses two oscillators, a reference frequency oscillator and a variable frequency oscillator which generates an electrical signal having a frequency controlled by the displacement (pressure variable) transducer. The Heyck system uses the fixed or reference frequency oscillator and the variable frequency oscillator to fill separate digital counters. The first counter, when filled, causes a gate to supply pulses to a third counter until the variable frequency oscillator has filled the second counter. Thus, the third counter contains a digital count proportional to the frequency difference between the periodic output signals from the two oscillators. The oscillators disclosed by Heyck are precision radio-frequency oscillators having both inductive and capacitive elements providing an output frequency that is inversely proportional to the square root of the product of the inductance and capacitance.

The Heyck patent mentions another system for detecting frequency variation caused by capacitance variation. This is accomplished with a fixed or reference frequency, a variable frequency due to capacitance change, a frequency equal to the difference between the fixed and variable frequencies and by use of a precision oscillator and divider to generate a precise counting period over which the difference frequency cycles are counted.

While capacitance variation can be detected as described above, the electrical circuits and necessary apparatus are very expensive and sensitive, require precise and individual calibration, and are very difficult to fabricate in large quantities in a way that would permit combined capacitive transducers and detection circuits of all to have identical transfer functions.

For mass production use of capacitive transducers and detection circuits, it is desirable to have a simple calibration method and identical transfer functions for all of the mass-produced units. If, for example, the frequency of the periodic output signal is inversely related to the capacitance that varies with a sensed parameter, it is desirable to have identical terms and coefficients (e.g., slope and offset) in the transfer function applicable to all of the mass-produced capacitive transducers and associated detection circuits. Accordingly, a simple, reliable and repeatable method of fabrication and, in particular, of calibration is very desirable.

SUMMARY OF THE INVENTION

This invention provides a circuit for converting the variation of an electrical capacitance, caused by pressure variation, to a frequency variation in a periodic electrical signal generated by the circuit. Circuitry for accomplishing this function includes a first oscillator, a second oscillator and a digital mixer. These circuit components are readily obtainable in the form of standard integrated circuit products commercially available from a number of manufacturers. Custom integrated circuits also can be used.

The first oscillator provides a first periodic electrical signal having a frequency inversely proportional to a timing capacitance of such first oscillator. A second periodic electrical signal is provided by the second oscillator. The second periodic electrical signal has a frequency inversely proportional to a timing capacitance that is variable and that is a part of the second oscillator. The digital mixer receives the first and second periodic signals as inputs and provides an output signal which is the difference between the first and second periodic signals.

DETAILED DESCRIPTION OF THE INVENTION

Figure 1:
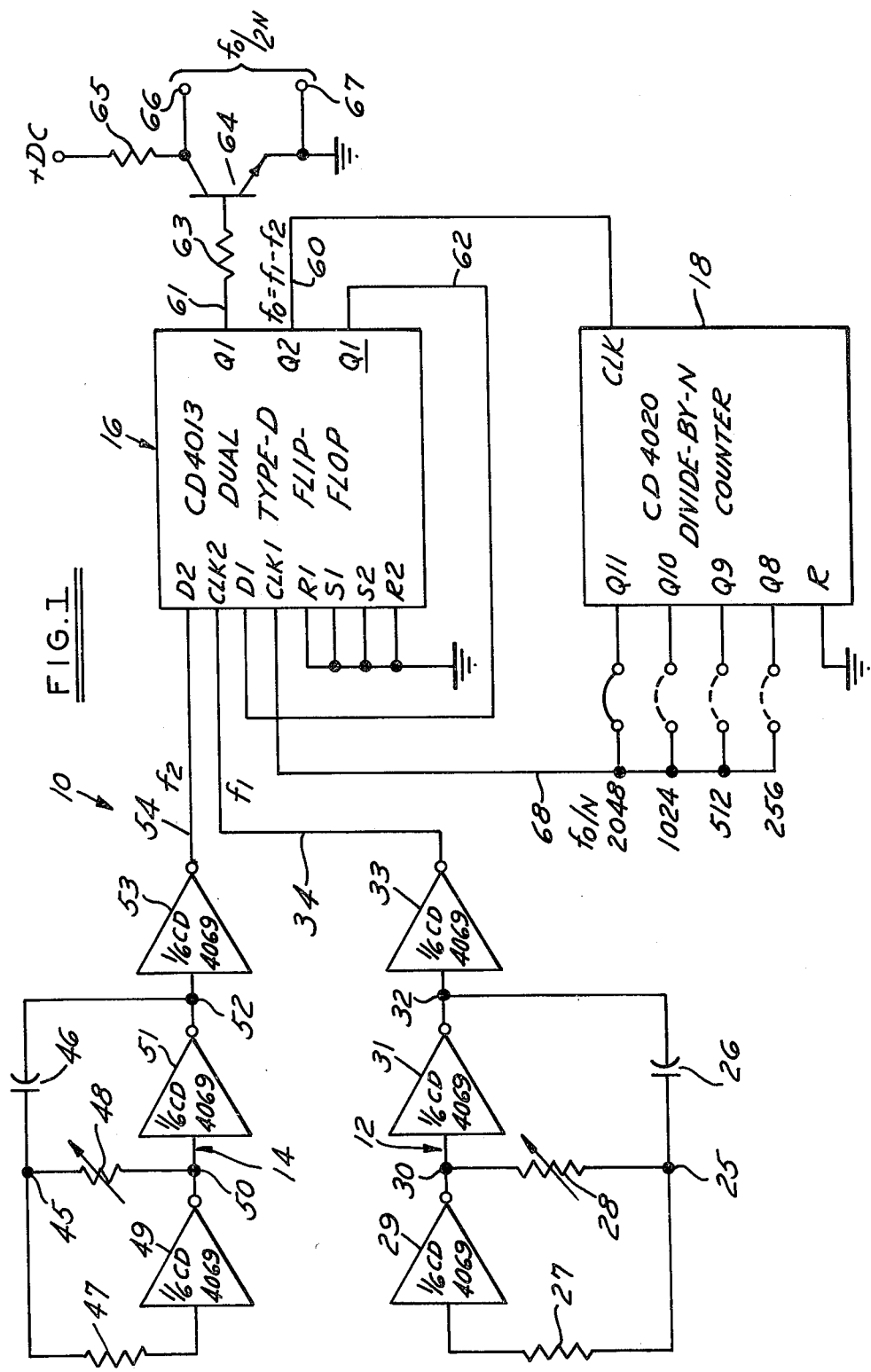
FIG. 1 is a schematic drawing of a circuit calibrated in accordance with an embodiment of this invention.

Referring to FIG. 1, a transducer 10 for converting pressure variation to frequency variation of a periodic output signal includes a dual type D flip flop 16 which has an input from an oscillator 14 at input D2 and an input from an oscillator 12 at input clock 2. Oscillator 12 provides a reference signal while oscillator 14 provides a signal responsive to pressure variation by having a pressure responsive capacitance 46. An output from flip flop 16 at Q2 has a frequency equal to the difference between the inputs at D2 and clock 2 and is applied to a clock input of a dive by N counter 18. Divide by N counter 18 has an output which is applied by a line 68 to an input clock 1 of flip flop 16. Counter 18 provides an output equal to the input frequency, $f_o$, divided by 256 at output Q8, divided by 512 at output Q9, divided by 1024 at output Q10, and divided by 2048 at output Q11. The reset of counter 18 is grounded. The output of transducer 10 occurs across a transistor 64 coupled by a resistor 63 through a line 61 to output Q1 of flip flop 16. A voltage is applied through a resistor 65 to the collector of transistor 64. The output is taken between collector terminal 66 and emitter terminal 67 of transistor 64.

Oscillator 12 includes sequentially coupled inverters 29, 31 and 33 which apply a frequency $f_1$ through line 34 to clock 2 input of flip flop 16. A capacitor 26 is connected between a node 32, located between inverters 31 and 33 to a node 25. A reference resistor 28 for adjusting the offset of a transfer function is coupled between a node 30 located between inverters 29 and 31 to node 25. Resistor 28 is varied in magnitude during calibration of transducer 10. A resistor 27 is coupled between the input of inverter 29 and node 25.

Oscillator 14 is analogous to oscillator 12 and includes the serial coupling of inverters 49, 51 and 53 which have an output frequency $f_2$ coupled to input D2 of flip flop 16 through a line 54. A capacitor 46 is coupled from a node 52, positioned between inverters 51 and 53 to a node 45. A sensor resistor 48 for adjusting the gain or slope of a transfer function is coupled from a node 50 between inverters 49 and 51 to node 45. Resistor 48 is varied in magnitude during calibration of transducer 10. A resistor 47 is coupled from the input of inverter 49 to node 45. The output frequency, $f_2$, is inversely proportional to the magnitude of capacitor 46 and directly proportional to the applied pressure.

A typical component for the inverters is one-sixth of a CD4069. A typical component for flip flop 16 is a CD4013 Dual Type-D flip flop. A typical component for divide by N counter 18 is CD4020.

Calibration of transducer 10 includes adjustment of sensor resistor 48 and reference resistor 28 so that the sensor frequency on line 54 and the reference frequency on line 34 are adjusted to produce a desired mixed output frequency on line 60.

Figure 2:
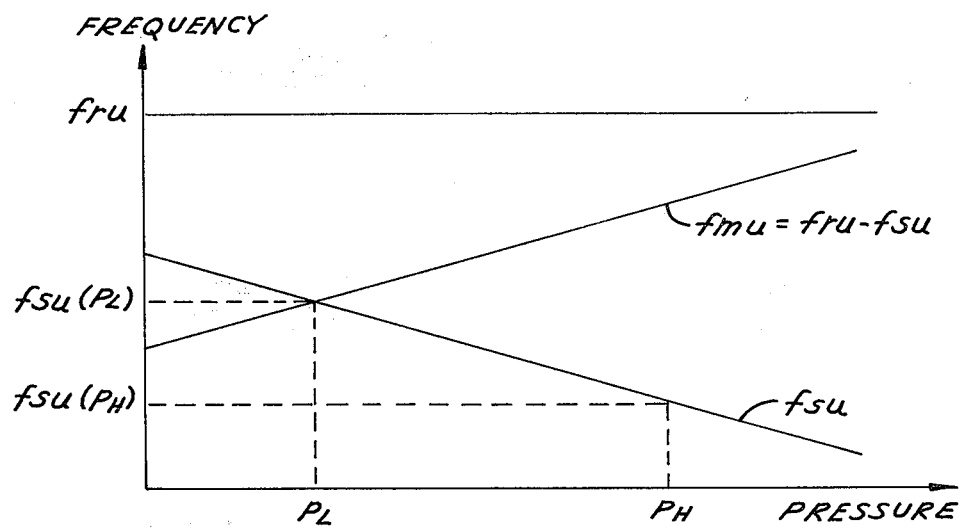
FIG. 2 is a graphical representation of the frequency versus pressure transfer function for the uncalibrated mixed frequency ($f_{mu}$), the uncalibrated sensor frequency ($f_{su}$), and the uncalibrated reference frequency ($f_{ru}$) in accordance with an embodiment of this invention.

Referring to FIG. 2, the uncalibrated frequency $f_{mu}$ is equal to the difference between the uncalibrated reference frequency, $f_{ru}$, and the uncalibrated sensor frequency, $f_{su}$ or $f_{mu}$ equals $f_{ru}$ minus $f_{su}$. To establish these lines a low pressure, $P_L$ and a high pressure, $P_H$, are applied to capacitor 46. Upon the application of the low pressure, the sensor frequency is measured on line 54 and a first point corresponding to pressure $P_L$ and frequency $f_{su}(P_L)$ is established. Upon application of a high pressure, $P_H$, a second point corresponding to $P_H$, $f_{su}(P_H)$, is established. From these two points, a straight line can be drawn establishing the uncalibrated sensor frequency, $f_{su}$. The uncalibrated reference frequency is a constant and can be measured by sensing the frequency on line 34 at either of the two applied pressures, $P_L$ or $P_H$. Subtraction of the values of the uncalibrated sensor frequency $f_{su}$, from the values of the uncalibrated reference frequency, $f_{ru}$, generates the uncalibrated mixed frequency transfer function. As a result, FIG. 2 shows the initial, uncalibrated transfer functions relating applied pressure and frequency output of the sensor oscillator 14, reference oscillator 12, and mixed output of flip flop 16.

Figure 3A:
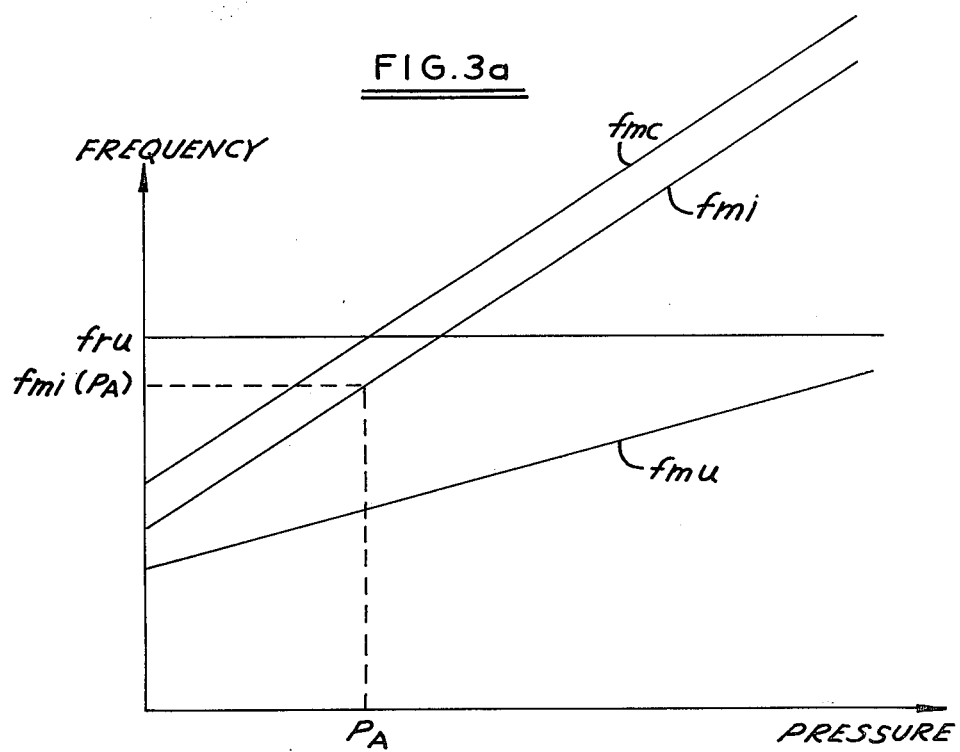
FIG. 3a is a graphical representation of the movement of the frequency versus pressure transfer function of the uncalibrated mixed frequency to an intermediate transfer function so it has the same slope as a desired, calibrated mixed frequency in accordance with an embodiment of this invention.

The goal of calibrating transducer 10 is to establish a transfer function between the pressure and the mixed output frequency at a desired gain and offset, corresponding to a desired slope and frequency axis (Y) intercept. This desired transfer function is shown in FIG. 3a, changing the uncalibrated mixed frequency transfer function $f_{mu}$, to the calibrated mixed frequency transfer function, $f_{mc}$, involves an intermediate step wherein an intermediate mixed frequency transfer function, $f_{mi}$ is established. The slope of the intermediate mixed frequency transfer function is the same as the slope of the calibrated mixed frequency transfer function. Since the slope of the intermediate mixed frequency transfer function is known, establishing a single point will, in combination with the known slope, completely define the intermediate mixed frequency transfer function. To establish this single point, capacitor 46 is exposed to an applied pressure $P_A$. while sensor resistor 48 is adjusted until a desired intermediate mixed frequency $f_{mi}(P_A)$ is achieved. The frequency desired by adjustment of the sensor resistor 48 is defined by the following equation for $f_{mi}$ evaluated at a pressure $P_A$.

$$f_{mi} = f_{ru} + \left[ \frac{P_H - P_L}{f_{su}(P_H) - f_{su}(P_L)} f_{su}(P_H) - P_H \right] m_c + m_c P_A$$

wherein $m_c$ is the desired calibrated slope of the transfer function labeled as $f_{mc}$ in FIG. 3a. As a result, when a pressure $P_A$ is applied, the frequency $f_{mi}$ can be calculated. When this calculated frequency is achieved by adjustment of sensor resistor 48, further adjustment of sensor resistor 48 is stopped and the resulting transfer function is as indicated in FIG. 3a as $f_{mi}$.

Figure 3B:
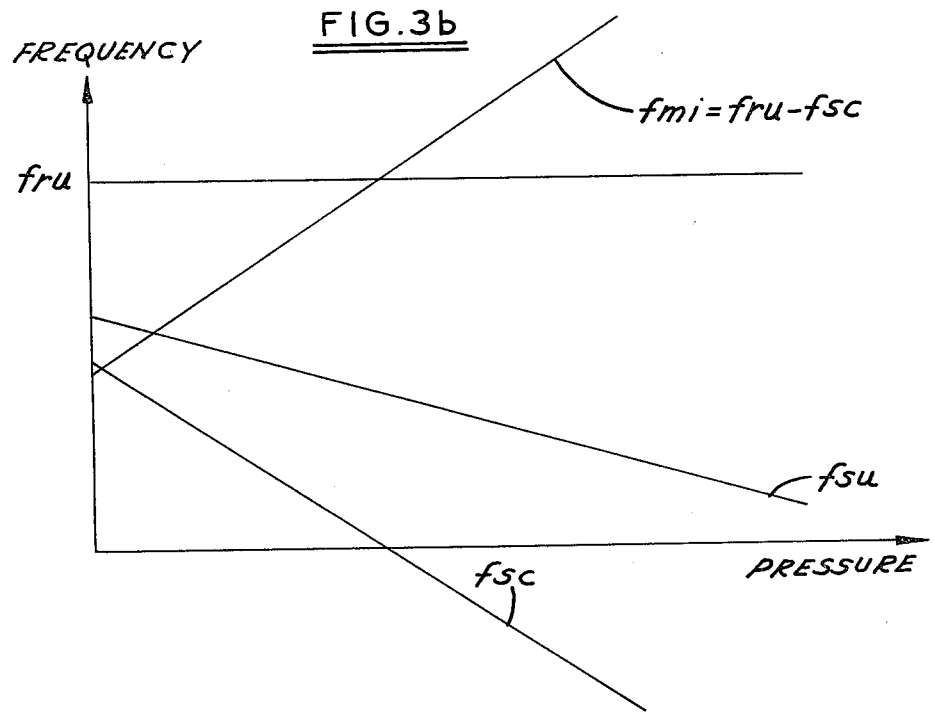
FIG. 3b is a graphical representation of the frequency versus pressure transfer function of the sensor frequency, changing from an uncalibrated to a calibrated frequency, to accomplish the change in the mixed frequency, from an uncalibrated mixed frequency to an intermediate mixed frequency in accordance with an embodiment of this invention.

Referring to FIG. 3b, the adjustment of sensor resistor 48 is shown graphically by the shift of the transfer function of the uncalibrated sensor frequency, $f_{sc}$. The transfer function for the uncalibrated reference frequency in contrast to the uncalibrated sensor frequency, remains the same during this shift. The shift in the sensor frequency causes a shift in the mixed frequency so that the intermediate mixed frequency, $f_{mi}$, is equal to the difference between the uncalibrated reference frequency and the calibrated sensor frequency, or $f_{mi} = f_{ru} - f_{sc}$.

Figure 4:
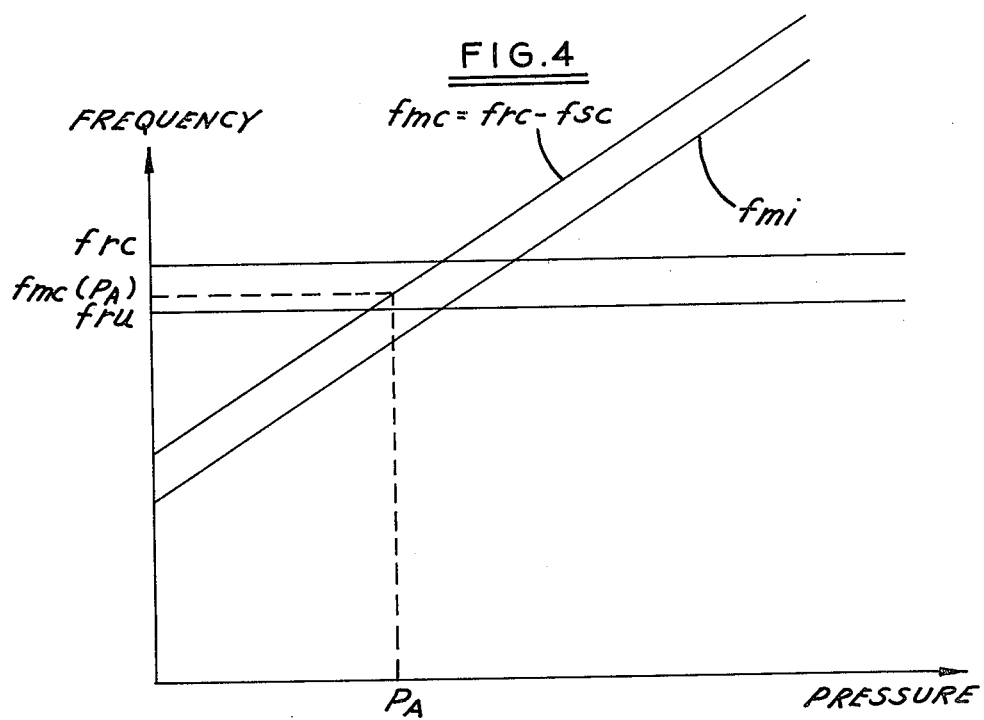
FIG. 4 is a graphical representation similar to FIG. 3a showing movement to change the uncalibrated reference frequency to a calibrated reference frequency thereby moving the transfer function representing the intermediae mixed frequency to the calibrated mixed frequency.

The remaining step to make the transfer function of the intermediate mixed frequency, $f_{mi}$, coincident with the transfer function of the calibrated mixed frequency, $f_{mc}$, involves a vertical shifting of the transfer function, $f_{mi}$, upward so that there is a new frequency axis intercept. This shift is shown in FIG. 4 and is the result of a shift in the reference frequency from an uncalibrated to a calibrated function. This is accomplished by an adjustment of the magnitude of reference resistor 28. The desired calibrated mixed frequency transfer function is known and is:

$$f_{mc} = b_c + (m_c)(P_A)$$

wherein $b_c$ is the desired calibrated frequency axis intercept.

That is, for a given applied pressure, $P_A$, the calibrated mixed frequency, $f_{mc}(P_A)$ can be calculated. When $P_A$ is applied, reference resistor 28 is adjusted causing a shift in the transfer function from the uncalibrated reference frequency to the calibrated reference frequency, $f_{rc}$. During this shift, the sensor frequency output on line 54 remains constant at the calibrated sensor frequency, $f_{sc}$. The calibrated mixed frequency $f_{mc}$, is defined to be the difference between the calibrated reference frequency, $f_{rc}$ and the calibrated sensor frequency $f_{sc}$.

In the above described method, it is necessary at some point in the procedure to measure the mixed frequency, the sensor frequency and the reference frequency. It is also possible to make the assumption that there are no errors in the combination of the sensor frequency and the reference frequency to produce the mixed frequency. If this assumption is made, then sensor resistor 48 and reference resistor 28 can be adjusted while measuring only the sensor frequency on line 54 and the reference frequency on line 34. This method of measuring only the sensor frequency and reference frequency is best shown by reference to FIGS. 3b and 4. That is, in FIG. 3b, the sensor fequency is shifted from an uncalibrated to a calibrated transfer function. This can be accomplished by measurement of only the sensor frequency while adjusting sensor resistor 48. Similarly, in FIG. 4, the reference frequency is shifted from an un-calibrated to a calibrated transfer function and this can be accomplished by measurement of the reference frequency on line 34. Since the mixed frequency output is not measured the resistor adjustments are made until the sensor frequency is equal to the following frequency as defined by equation A:

$$f_{sc}(P_A) = \left[ P_H - \frac{(P_H - P_L)}{f_{su}(P_L) - f_{su}(P_H)} f_{su}(P_H) \right] m_c - m_c(P_A)$$

note that in the special case where $P_A = P_H$ $$f_{sc}(P_A) - \left[ \frac{(P_H - P_L)}{f_{su}(P_H) - f_{su}(P_L)} \right] [f_{su}(P_H)] m_c$$

Similarly, the reference frequency is adjusted by adjusting of the reference resistor 28 until the output reference frequency is in accordance with the following equation B.

$$f_{rc} = b_c + \left[ P_H - \frac{(P_H - P_L)}{f_{su}(P_H) - f_{su}(P_L)} \right] [f_{su}(P_H)] m_c$$

If it is desired to reduce the mixed frequency by a factor such as $2^N$ as indicated by the output taken across terminals 66 and 67 in FIG. 1, the step of dividing the mixed frequency can be added. This was shown by the inclusion by the divide by N counter 18 in FIG. 1.

Various modifications and variations will no doubt occur to those skilled in the various arts to which this invention pertains. For example, the particular fabrication technique used in the manufacture of the integrated circuit may be chosen from any number of known techniques. It may be advantageous to use large scale integration techniques for high volume requirements. These and all other variations which basically rely on the teachings through which this disclosure has advanced the art are properly considered within the scope of this invention.

I claim:

1. A transducer for converting a pressure variation to a variation in the frequency of a periodic function, said transducer comprising:

a reference oscillator means having a reference timing capacitor and a reference resistor for providing a reference periodic electrical signal having a frequency which is a function of the capacitance and resistance, respectively, of said reference timing capacitor and said reference resistor such that the frequency is inversely proportional to the magnitude of the capacitance of the reference timing capacitor;

a sensor oscillator means having a variable sensor timing capacitor and a sensor resistor for providing a sensor periodic electrical signal having a frequency which is a function of the capacitance and resistance, respectively of said variable sensor timing capacitor and said sensor resistor such that the frequency is inversely proportional to the magnitude of the capacitance of the sensor timing capacitor so as to provide a linear transfer function between pressure input and frequency output;

said sensor timing capacitor being a type of capacitor wherein the capacitance change is produced by the displacement of one of the capacitor plates such that the capacitance is inversely proportional to pressure;

a digital mixer means responsive to said reference and sensor electrical signals for generating a mixed periodic electrical signal having a frequency proportional to the difference between said reference and sensor electrical signals;

a frequency divider means coupled to said digital mixer means, between an input and an output to said digital mixer means, for reducing substantially all harmonic frequencies introduced by said mixer; and said transducer having a transfer function relating pressure and frequency which is substantially linear and adjustable by adjustment of the magnitude of said reference and sensor resistors.

2. A transducer as recited in claim 1 further comprising:

said divider means coupled to the output of said digital mixer means for reducing the frequency of the mixed periodic electrical signal to be within a predetermined range of magnitudes thus permitting use of higher frequencies as outputs of said reference and sensor oscillators while maintaining the reduced frequency of the mixed periodic electrical signal within said predetermined range of magnitudes.

3. A transducer as recited in claim 2 wherein:

said reference oscillator includes a first, a second and a third serially connected inverter, a serial combination of said reference timing capacitor and a first resistor being connected between the output of said second inverter and the input of said first inverter, said reference resistor being connected between the output of said first inverter and a node between said reference timing capacitor and said first resistor; and said sensor oscillator includes a fourth, a fifth and a sixth serially connected inverters, a serial combination of said sensor timing capacitor and a second resistor being connected between the output of said fifth inverter and the input of said fourth inverter, said sensor resistor being connected between the output of said fourth inverter and a node between said sensor timing capacitor and said second resistor.

4. A transducer as recited in claim 3 wherein:

said digital mixer means is a flip flop having a clock 2 input coupled to the output of said third inverter of said reference oscillator means, a D2 input coupled to the output of the sixth inverter of said sensor oscillator means, a clock 1 input coupled to the output of said divider, R1, S1, S2 and R2 inputs coupled to ground, a first Q1 output, a Q2 output coupled to a clock input of said divider, and a second Q1 output coupled to a D1 input.

5. A transducer as recited in claim 4 further comprising an output buffer including a transistor having a base coupled through an input resistor to said first Q1 output of said flip flop, a collector coupled to a DC source through a collector resistor, and a grounded emitter, the output being taken across the collector and emitter of said transistor.

6. A transducer as recited in claim 5 wherein said divider means is a divide by N counter having a clock input coupled to said Q2 output of said flip flop, a reset coupled to ground, a Q8 output for dividing by 256, a Q9 output for dividing by 512, a Q10 output for dividing by 1024 and a Q11 output for dividing by 2048, the outputs being selectively connected to provide a division of the output frequency of said flip flop, the output taken across the output transistor of said output buffer being the frequency difference of the reference and sensor frequencies divided by twice the selected divider output of said counter.

7. A transducer as recited in claim 5 wherein said divider means has a sufficient range of division so that the same transfer function relating pressure to frequency can be maintained even if there is a variation in frequency inputs applied to said flip flop from said reference oscillator and said sensor oscillator due to corresponding differences in the physical characteristics establishing a transfer function relating capacitance to pressure, of sensor capacitor used in said oscillator means.

* * * * *